United States Patent
Woolmer

(10) Patent No.: US 9,054,566 B2
(45) Date of Patent: *Jun. 9, 2015

(54) ELECTRIC MACHINE—EVAPORATIVE COOLING

(71) Applicant: Isis Innovation Ltd., Oxford Oxfordshire (GB)

(72) Inventor: Tim Woolmer, Oxford (GB)

(73) Assignee: Isis Innovation LTD, Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,322

(22) Filed: Oct. 9, 2013

(65) Prior Publication Data

US 2014/0034402 A1 Feb. 6, 2014

Related U.S. Application Data

(63) Continuation of application No. 13/258,839, filed as application No. PCT/GB2010/050613 on Apr. 13, 2010, now Pat. No. 8,581,455.

(30) Foreign Application Priority Data

Apr. 14, 2009 (GB) .................................. 0906284.5

(51) Int. Cl.
*H02K 9/18* (2006.01)
*H02K 9/20* (2006.01)
(Continued)

(52) U.S. Cl.
CPC .. *H02K 9/20* (2013.01); *H02K 5/18* (2013.01); *H02K 7/14* (2013.01); *H02K 21/24* (2013.01); *H02K 49/04* (2013.01); *B60K 7/0007* (2013.01)

(58) Field of Classification Search
CPC ....................................................... H02K 9/20
USPC .................. 310/52–64, 67 R; 180/229, 65.51
See application file for complete search history.

(56) References Cited

U.S. PATENT DOCUMENTS 2,606,946 A 8/1952 Fisher
3,150,277 A 9/1964 Chubb et al.
(Continued)

FOREIGN PATENT DOCUMENTS

DE 19600612 7/1997
EP 0484548 5/1992
(Continued)

OTHER PUBLICATIONS

Machine Translation, Kawamura et al., JP 2006014522 A, Jan. 12, 2006.*

(Continued)

*Primary Examiner* — Quyen Leung
*Assistant Examiner* — Thomas Truong
(74) *Attorney, Agent, or Firm* — Meunier Carlin & Curfman LLC

(57) ABSTRACT

An electric machine comprises a rotor, preferably having permanent magnets, although other field generation means are available, and a stator. The stator has coils wound on stator bars for interaction with the magnetic field of the rotor across an air gap defined between them. The rotor comprises a housing of a chamber containing refrigerant. The rotor housing has heat dissipating fins accessible by the open environment whereby air movement relative to the housing caused at least by rotation of the rotor absorbs heat from the fins. The machine may be an axial flux machine, the coils being wound on bars that are disposed circumferentially spaced around a fixed axle of the machine forming a rotational axis of the rotor. The machine may be a wheel motor for a vehicle, wherein the wheel is mounted directly on the rotor housing.

30 Claims, 5 Drawing Sheets

(51) Int. Cl.

| | | |
|---|---|---|
| *H02K 21/12* | (2006.01) | |
| *B60K 1/00* | (2006.01) | |
| *H02K 5/18* | (2006.01) | |
| *H02K 7/14* | (2006.01) | |
| *H02K 21/24* | (2006.01) | |
| *B60K 7/00* | (2006.01) | |
| *H02K 49/04* | (2006.01) | |

(56) References Cited

U.S. PATENT DOCUMENTS

| | | | |
|---|---|---|---|
| 3,217,193 | A | 11/1965 | Rayner |
| 3,413,503 | A | 11/1968 | Parker |
| 4,082,971 | A | 4/1978 | Miyake et al. |
| 4,435,662 | A | 3/1984 | Tawse |
| 4,447,750 | A | 5/1984 | Howlett et al. |
| 4,464,592 | A | 8/1984 | Major |
| 5,334,899 | A | 8/1994 | Skybyk |
| 5,345,777 | A | 9/1994 | Sekino et al. |
| 5,355,039 | A | 10/1994 | Couture |
| 5,394,040 | A | 2/1995 | Khanh |
| 5,517,072 | A | 5/1996 | Hildebrandt |
| 5,578,879 | A | 11/1996 | Heidelberg et al. |
| 5,894,902 | A | 4/1999 | Cho |
| 5,910,697 | A | 6/1999 | Sromin et al. |
| 5,982,070 | A | 11/1999 | Caamano |
| 6,100,615 | A | 8/2000 | Birkestrand |
| 6,286,616 | B1 | 9/2001 | Kutter |
| 6,304,011 | B1 | 10/2001 | Pullen et al. |
| 6,355,996 | B1* | 3/2002 | Birkestrand ............ 310/54 |
| 6,488,486 | B1 | 12/2002 | Debleser |
| 6,515,384 | B1 | 2/2003 | Kikuchi et al. |
| 6,720,688 | B1 | 4/2004 | Schiller |
| 6,849,982 | B2 | 2/2005 | Haydock et al. |
| 6,903,471 | B2 | 6/2005 | Arimitsu et al. |
| 6,922,004 | B2 | 7/2005 | Hashimoto et al. |
| 7,002,277 | B2 | 2/2006 | Yamamoto et al. |
| 7,135,800 | B2 | 11/2006 | Yamada et al. |
| 7,227,286 | B2* | 6/2007 | Kudo et al. ............ 310/58 |
| 7,411,325 | B1* | 8/2008 | Gabrys ............ 310/68 R |
| 7,445,067 | B2 | 11/2008 | Marsh et al. |
| 7,728,447 | B2 | 6/2010 | Becquerelle et al. |
| 8,264,107 | B2 | 9/2012 | Jee |
| 2004/0145252 | A1 | 7/2004 | Arimitsu et al. |
| 2004/0164641 | A1 | 8/2004 | Yamada et al. |
| 2004/0174087 | A1 | 9/2004 | Heidrich |
| 2005/0035676 | A1 | 2/2005 | Rahman et al. |
| 2005/0140244 | A1 | 6/2005 | Yamada et al. |
| 2006/0091761 | A1 | 5/2006 | Lafontaine et al. |
| 2006/0103263 | A1* | 5/2006 | Naito et al. ............ 310/268 |
| 2006/0113856 | A1 | 6/2006 | Tanno et al. |
| 2006/0279150 | A1 | 12/2006 | Kojima et al. |
| 2007/0018520 | A1 | 1/2007 | Kaneko et al. |
| 2007/0046124 | A1 | 3/2007 | Aydin et al. |
| 2007/0138876 | A1 | 6/2007 | Evans et al. |
| 2007/0199339 | A1 | 8/2007 | Ishihara et al. |
| 2008/0099258 | A1 | 5/2008 | Berhan |
| 2009/0025830 | A1 | 1/2009 | Uozumi et al. |
| 2009/0218540 | A1 | 9/2009 | Takami et al. |
| 2011/0156519 | A1 | 6/2011 | Wang et al. |

FOREIGN PATENT DOCUMENTS

| | | | |
|---|---|---|---|
| EP | 1292004 | A1 | 3/2003 |
| EP | 1739810 | A2 | 1/2007 |
| FR | 2823382 | | 10/2002 |
| GB | 2379093 | | 2/2003 |
| JP | S50088510 | | 7/1975 |
| JP | 62201034 | | 9/1987 |
| JP | 63209455 | A | 8/1988 |
| JP | 05185847 | | 1/1992 |
| JP | 04359653 | | 12/1992 |
| JP | 0591696 | | 4/1993 |
| JP | H11-178310 | | 7/1999 |
| JP | 2002281722 | | 9/2002 |
| JP | 2003088032 | A | 3/2003 |
| JP | 2004274838 | | 9/2004 |
| JP | 2004312984 | A | 11/2004 |
| JP | 2005151725 | A | 6/2005 |
| JP | 2005224054 | A | 8/2005 |
| JP | 2005253188 | A | 9/2005 |
| JP | 2005261083 | | 9/2005 |
| JP | 2006014522 | | 1/2006 |
| JP | 2006014522 | A * | 1/2006 |
| JP | 2006033965 | A | 2/2006 |
| JP | 2006248417 | | 9/2006 |
| JP | 2006304474 | A | 11/2006 |
| JP | 2007060748 | A | 3/2007 |
| JP | 2007143365 | A | 6/2007 |
| JP | 2008079397 | A | 4/2008 |
| JP | 2008131684 | A | 6/2008 |
| SE | 384766 | | 5/1976 |
| SU | 551763 | | 3/1977 |
| SU | 955379 | | 8/1982 |
| WO | 98/07227 | | 2/1998 |
| WO | 00/48294 | | 8/2000 |
| WO | 03/094327 | | 11/2003 |
| WO | 2006/066740 | | 6/2006 |
| WO | 2007141489 | A2 | 12/2007 |
| WO | 2008/032430 | | 3/2008 |
| WO | 2008091035 | | 7/2008 |
| WO | 2010/092400 | | 8/2010 |
| WO | 2010092400 | A1 | 8/2010 |
| WO | 2010092402 | A1 | 8/2010 |
| WO | 2010092403 | A1 | 8/2010 |
| WO | 2010/119281 | | 10/2010 |

OTHER PUBLICATIONS

Woolmer, T.J., et al., "Analysis of the Yokeless and Segmented Armature Machine," International Electric Machines and Drives Conference (IEMDC), Antalya, Turkey, May 3-5, 2007, 7 pages.

Related U.S. Appl. No. 13/148,871, filed Aug. 10, 2011.

International Report on Patentability and Written Opinion, dated Aug. 16, 2011, received in connection with related International Application No. PCT/GB2010/050234.

International Search Report, dated May 6, 2011, received in connection with related International Application No. PCT/GB2010/050234.

International Report on Patentability and Written Opinion, dated Oct. 18, 2011, received in connection with related International Application No. PCT/GB2010/050613.

International Search Report, dated Mar. 17, 2011, received in connection with related International Application No. PCT/GB2010/050613.

Final Office Action from U.S. Appl. No. 13/148,871 dated Jun. 2, 2014.

English Translation of Japanese Office Action issued Mar. 18, 2014, in related Japanese Application No. 2012-505237.

English Translation of Japanese Office Action issued Feb. 25, 2014, in Japanese Application No. 2011-549676.

Office Action from U.S. Appl. No. 13/148,871 dated Dec. 6, 2013.

Office Action received in related U.S. Appl. No. 13/148,871 on Jan. 2, 2015.

Final Office Action received in related U.S. Appl. No. 13/148,897 on Jan. 8, 2015.

Office Action issued in related JP Application No. 2011-549676 issued Oct. 28, 2014.

Advisory Action issued in U.S. Appl. No. 13/148,871 on Sep. 22, 2014.

English Translation of Japanese Office Action issued Mar. 18, 2014, in Japanese Application No. 2011-549677.

English Translation of Japanese Office Action issued Feb. 25, 2014, in Japanese Application No. 2011-549678.

Restriction Requirement for U.S. Appl. No. 13/148,897, mailed Dec. 6, 2013.

Non-Final Office Action issued in U.S. Appl. No. 13/148,897, mailed Mar. 28, 2014.

(56) References Cited

OTHER PUBLICATIONS

Related U.S. Appl. No. 13/148,863, filed Aug. 10, 2011.
Related U.S. Appl. No. 13/148,897, filed Aug. 10, 2011.
International Search Report, dated May 6, 2011, received in connection with International Application No. PCT/GB2010/050237.
International Preliminary Report on Patentability, dated Aug. 16, 2011, received in connection with International Application No. PCT/GB2010/050237.
International Search Report, dated Jul. 9, 2010, received in connection with International Application No. PCT/GB2010/050236.
International Preliminary Report on Patentability, dated Aug. 16, 2011, received in connection with International Application No. PCT/GB2010/050236.
Non Final Office Action for U.S. Appl. No. 13/148,863 dated Apr. 23, 2014.
Notice of Allowance for U.S. Appl. No. 13/148,863 dated Nov. 21, 2014.

* cited by examiner

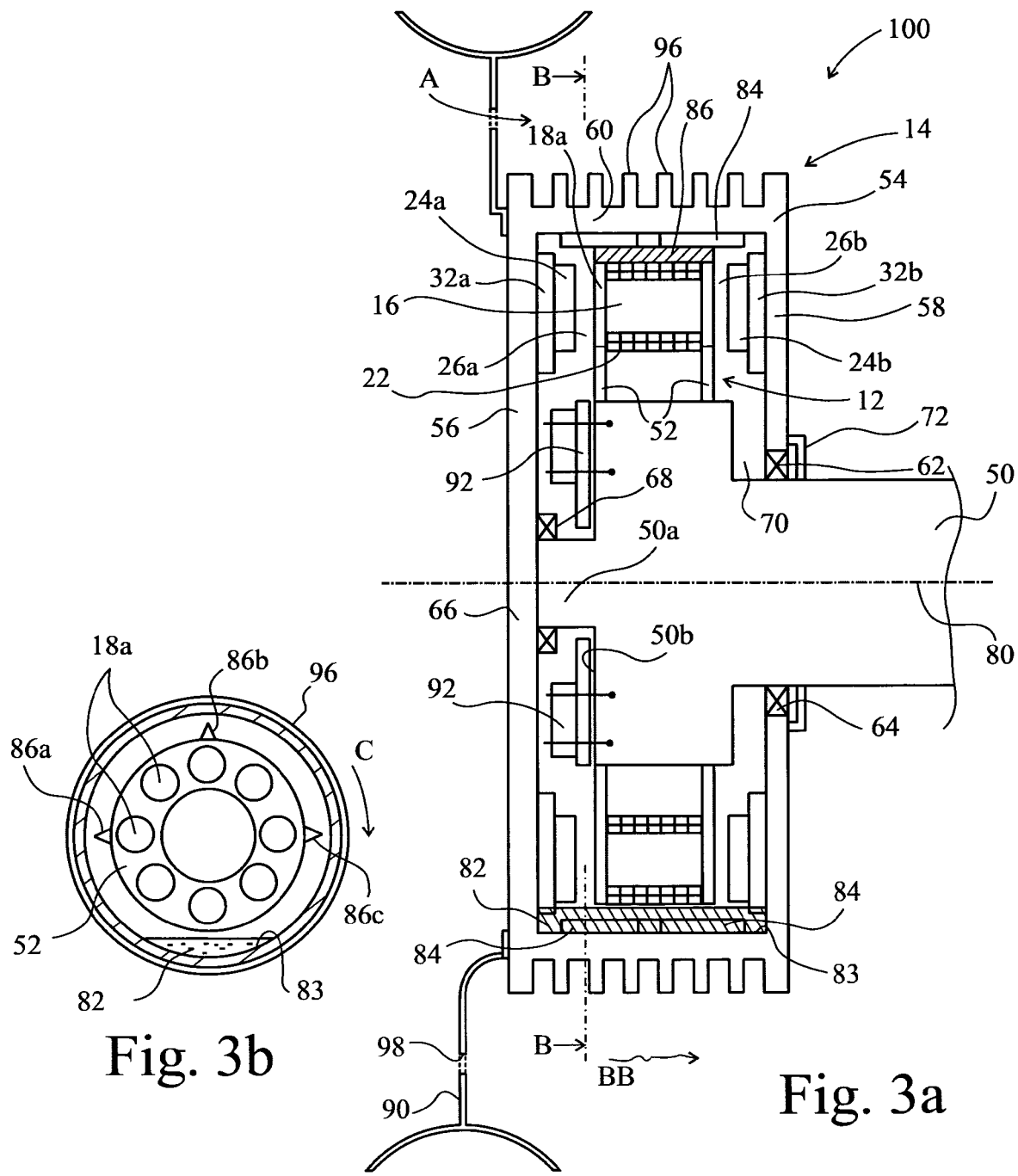

ELECTRIC MACHINE—EVAPORATIVE COOLING

CROSS REFERENCE TO RELATED APPLICATIONS

This application is a continuation application of U.S. patent application Ser. No. 13/258,839 filed Sep. 22, 2011, which is a 35 USC 371 national phase of International Application No. PCT/GB2010/050613 filed Apr. 13, 2010, which claims priority to U.K. Patent Application No. 0906284.5 filed Apr. 14, 2009, the contents of all of which are hereby incorporated herein by reference in their entirety.

FIELD OF INVENTION

This invention relates to an electric machine comprising a stator and a rotor journalled for rotation around the stator. The stator is provided with coils and the rotor is provided with means to generate a rotor magnetic field to cooperate with the coils across an air gap between the rotor and stator. The machine will usually be a motor but it may be a generator and is in many embodiments an axial flux machine. In particular it relates to a yokeless and segmented armature machine (hereinafter termed a "Y machine"), particularly to a permanent magnet machine.

BACKGROUND

Woolmer and McCulloch [1] describe the topology of a Y machine, discussing its advantages of reduced iron in the stator enabling an improvement in torque density. It comprises a series of coils wound around bars spaced circumferentially around the stator, ideally axially disposed, (ie parallel the rotation axis of the rotor). The rotor has two stages comprising discs provided with permanent magnets that face either end of each coil of the stator. The magnetic path at any stage of operation is: through a first coil into a first magnet on a first stage of the rotor; across a back iron of the rotor to an adjacent second magnet on the first stage; through a second coil of the stator adjacent the first coil; into a first magnet on the second stage of the rotor aligned with the second magnet on the first stage; across the back iron of the second stage to a second magnet on the second stage and aligned with the first magnet on the first stage; and completing the circuit through the first coil.

One difficulty with electric machines generally is to provide adequate cooling. This is a particular problem with a Y machine having a high torque density that significant heat is generated in the coils at high torques and is often a limiting factor in the torques that can be employed, at least for extended periods of time. Also, the coils are isolated from one another and therefore cooling only one region of the motor is insufficient as there is low conduction of heat between coils.

WO-A-2006/066740 discloses a Y machine comprising a housing having a cylindrical sleeve mounting stator coils internally, the sleeve being hollow whereby cooling medium is circulated. However, the coils are embedded in a thermally conducting material to carry heat to stator housing. A rotor is rotatably journalled in the housing. The stator bars appear to be laminated, as they are in GB-A-2379093 that also discloses a Y machine, as does WO-A-03/094327. No cooling arrangements are mentioned.

U.S. Pat. No. 6,720,688 discloses a Y machine in which the rotor acts as a vane pump to circulate fluid within a chamber defined by a stator housing through which a rotor shaft, supported on bearings in the housing and carrying the rotor, extends. The fluid cools stator coils.

Of course, cooling problems are not limited to Y motors. The idea of evaporative cooling has been employed in, for example, SU-955379, where a hollow rotor shaft appears to extend into an external rotating housing so that refrigerant evaporating in the shaft cools the rotor and vapour condenses in the external housing releasing its heat before returning as a liquid. U.S. Pat. No. 5,394,040 discloses a similar arrangement. SE-A-7411152 likewise appears to disclose evaporative cooling of a motor. These devices are passive, where the cooling circuit is self-driven, but more active arrangements are disclosed. U.S. Pat. No. 3,217,193 sprays liquid refrigerant on the hot parts of a motor or generator. US-A-2007/0199339 discloses a complete refrigerant circuit with valves ensuring correct directional flow between passages through the stator and an external heat exchanger. This development is of particular interest to the present invention which finds a primary application in wheel motors for vehicles.

Indeed, it is an object of the present invention to provide an electric machine with effective, but nevertheless passive, evaporative cooling arrangements. It is a particular object to minimize the additional elements and equipment required for cooling, whereby the cost in terms of power lost through the cooling arrangements can be minimized.

BRIEF SUMMARY OF THE DISCLOSURE

In accordance with the present invention there is provided an electric machine comprising a rotor having a rotor field and a stator having coils for magnetic interaction with the rotor field across an air gap defined between the rotor and stator, wherein the stator is a fixed component with respect to a mounting for the machine and the rotor rotates around the stator externally thereof forming a rotating housing defining a sealed chamber between the rotor and stator incorporating cooling medium to cool the coils, and wherein the cooling medium has a boiling point less than a design temperature of operation of the stator and more than design temperature of operation of the rotor housing, and wherein the rotor housing has a heat dissipating external surface accessible by a coolant. Preferably, the coolant is ambient air of the open environment.

The chamber in use comprises a volume that is preferably filled to less than about 25% by volume with said cooling medium when liquid. The volume ratio of liquid to vapour changes as temperature rises and pressure increases. The fill volume of less than 25% refers to ambient conditions. Preferably the remaining volume is filled only with the cooling medium in vapour form. The pressure in the chamber is preferably ambient when the machine is not operating. Pressure accommodating means they may be provided.

Preferably, the electric machine is an axial flux machine, the coils being wound on bars that are disposed circumferentially spaced around a fixed axle of the machine forming a rotational axis of the rotor. Preferably, the bars are parallel to the rotational axis, the rotor comprising two stages each having permanent magnets interacting with each end of the bars.

Preferably, the stator is mounted on a stub axle of said mounting and on which stub axle said rotor is rotationally journalled.

Preferably, the rotor stages each comprise an annular dish, whose outer rims are connected together by a sleeve and which mount said permanent magnets, an inner rim of one stage being journalled on said stub axle, and the other stage being closed by a plate.

Preferably, said plate is also journalled on an end of said stub axle extending through said stator.

Preferably, said sleeve has fins to shed heat externally. The fins may be radially directed or axially directed. The sleeve may be coned so as to ensure that some area of it is available for contact by cooling medium vapour. The chamber is preferably sealed on said stub axle by a lip seal. However, any suitable alternative may be employed.

Preferably, diffusive material is disposed around and between said coils whereby liquid cooling medium is captured and transported to the coils and vapour from the liquid cooling medium evaporating from the coils escapes. The diffuse material acts as a wick, similar to its application in a heat pipe.

Preferably, paddles are disposed internally of the rotor housing to wash liquid cooling medium around the stator.

Preferably, scrapers are disposed on the stator to scoop onto the stator liquid cooling medium held against the inside of the rotor housing by centripetal acceleration.

In one embodiment, said machine is a motor. Indeed, it may be a wheel motor of a vehicle.

Thus, in one aspect, the invention provides a vehicle having a stub axle suspended from vehicle and on which a motor as defined above is mounted. Preferably, a wheel of the vehicle is mounted on said rotor housing. Preferably, regenerative braking is employed to retard the vehicle. In any event, preferably, a brake disc is mounted on said rotor housing. Said disc may be mounted on said one stage of the rotor. The wheel preferably has apertures to allow access to air passing the vehicle to flow through the wheel and act as said coolant to cool the rotor housing. Preferably, said fins are shaped to draw air through said apertures. Said shape may be the fins having a helical form on said housing.

In another embodiment, said machine is a generator, means being provided to rotate the rotor about said stator. Said means may comprise a belt and pulley. While the invention can perfectly feasibly operate as a generator, in that event, if the generator is stationary and accessible by users, it may be necessary, or at least desirable, to guard the rotating rotor to prevent accidental contact with users. The guard needs to have access to coolant flow (preferably airflow) in order to enable the rotor to shed heat.

BRIEF DESCRIPTION OF THE DRAWINGS

Embodiments of the invention are further described hereinafter with reference to the accompanying drawings, in which:

FIGS. 3a and b are respectively a side section of a motor in accordance with the present invention and a section on the line B-B in FIG. 3a;

FIGS. 4a and b are respectively a perspective view of the stator of the motor of FIG. 3 and a side view of a detail of FIG. 4a;

FIG. 8 is a side section through a motor and wheel similar to that shown in FIG. 3a.

DETAILED DESCRIPTION

Figure 1:
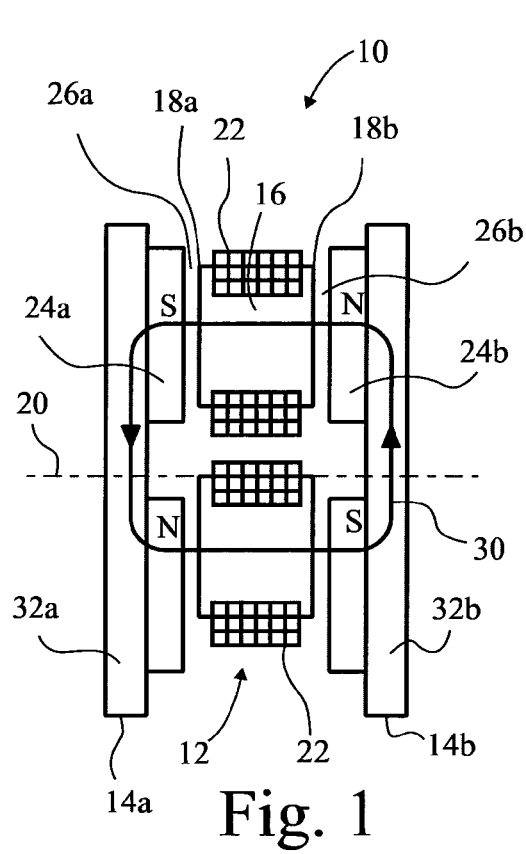
FIG. 1 is a schematic side view of a yokeless and segmented armature machine to which the present invention primarily (but not exclusively) relates.

A yokeless and segmented armature machine 10 is illustrated schematically in FIG. 1. The machine 10 comprises a stator 12 and two rotors 14a,b. The stator 12 is a collection of separate stator bars 16 spaced circumferentially about a rotation axis 20 of the rotors 14a,b. Each bar 16 has its own axis 16a which is disposed parallel to the rotation axis 20. However, that is not absolutely essential. In an axial flux machine, the axis 16a is indeed parallel the rotation axis 20. However, it can be disposed at any angle thereto, even radially with respect to the rotation axis 20. The following discussion is in respect of an axial flux machine, but this should not be understood to be limiting in any sense and, where the context permits, the invention equally applies to other inclinations of the stator bars 16.

Each end of each stator bar is provided with a shoe 18a,b which serves a physical purpose of confining a coil stack 22, which stack 22 is preferably of square section insulated wire (or possibly rectangular section) so that a high fill factor can be achieved. The coils 22 are connected to an electrical circuit (not shown) that (in the case of a motor) energizes the coils so that the poles of the resultant magnetic fields generated by the current flowing in the coils is opposite in adjacent stator coils 22.

The two rotors 14a,b carry permanent magnets 24a,b that face one another with the stator coil 22 between. Indeed, in the axial flux machine, the rotors and their magnets are radially disposed, but when the stator bars are inclined, then they are likewise. Two air gaps 26a,b are disposed between respective shoe and magnet pairs 18a/24a, 18b/24b. There are an even number of coils and magnets spaced around the axis of rotation 20 and, preferably, there are a different number of coils and magnets so that each coil does not come into registration with a corresponding magnet pair all at the same time and at the same rotational position of the rotor with respect to the stator. This serves to reduce cogging.

In a motor (with which the present invention is primarily concerned) the above-mentioned electric circuit is arranged to energize the coils 22 so that their polarity alternates serving to cause coils at different times to align with different magnet pairs, resulting in torque being applied between the rotor and the stator. The rotors 14a,b are generally connected together (for example by a shaft, not shown, although see below) and rotate together about the axis 20 relative to the stator 12, which is generally fixed (for example in a housing, not shown, although, again, see below). One advantage provided by the arrangement is illustrated in FIG. 1 in that the magnetic circuit 30 is provided by two adjacent stator bars 16 and two magnet pairs 24a,b. Thus, no yolk is required for the stator 12, although a back iron 32a,b is required for each rotor linking the flux between the back of each magnet 24a,b facing away from the respective coils 22.

Thus, in the case of a motor, by appropriate energization of the coils 22, the rotor 14 can be urged to rotate about the axis 20. Of course, in the situation of a generator, rotation of the rotor 14a,b induces currents in the stator coils 12 according to the changing magnetic flux induced in the stator bars 16 as the rotors 14a,b rotate.

However, in either case heat is generated in the coils 22 and the efficiency of the machine is reduced, and its capacity limited, if this heat is not removed. Accordingly, the present invention suggests enclosing the stator coils 16 within a housing formed by the rotor and which is supplied with a refrigerant cooling medium.

Turning to FIG. 3a, a motor 100 according to the present invention comprises a stator 12 mounted on a stub axle 50 of a vehicle (not shown). The stator comprises coils 22 mounted on bars 16 supported between stator plates 52 fixed to the stub axle 50. A rotor 14 comprises a housing 54 formed of 2 annular plates 56,58 connected at their outer rims by a sleeve 60. Annular plate 58 is rotationally journalled through bearings 62 on the stub axle 60 which passes through an aperture 64 in the annular plate 58. Annular plate 56 is filled with a centre plate 66 that is also journalled on end 50a of the stub axle through bearings 68. Rotor housing 14, formed by the annular plates 56,58, sleeve 60 and end plate 66, encloses a chamber 70 that is sealed by rotary lip seals 72 disposed between the annular plate 58 and the stub axle 50.

Rotor plates 56,58 are made from any convenient material and are preferably non-ferromagnetic. In that event, annular back irons 32a,b are provided which are of magnetically linking material and on which permanent magnets 24a,b are disposed, aligned with the stator bars 16, and defining the air gaps 26a,b between them.

A wheel 90 of the vehicle is mounted by any convenient means (not shown) on the rotor housing 14. Also, inboard of the housing plate 58, a brake disc (not shown) may be mounted on the rotor housing 54 for interaction with a caliper (not shown) mounted on the stub axle 50.

Figure 2:
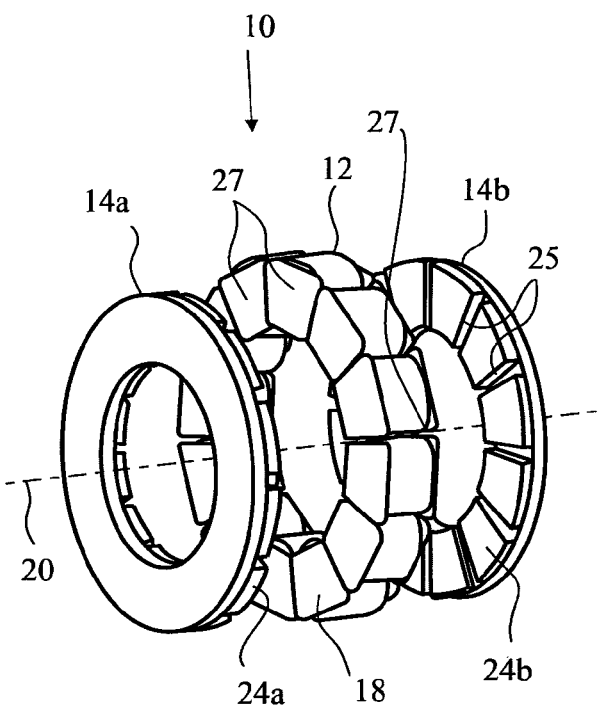
FIG. 2 is a perspective view of the arrangements of FIG. 1.

Power electronics 92 for operating the motor 100 may be mounted on a front flange 50b of the stub axle 50. They may be supplied from the vehicle with cabling through channels (not shown) through the stub axle 50. The power electronics 92, control energization of the cols 22 to cause magnetic interaction with the magnets 24a,b, as described above with reference to FIGS. 1 and 2, and in order to drive the rotor around the stub axle 50, around an axis of rotation 80.

Heat generated by the coils 22 must be dissipated; otherwise the torque capacity of the motor will be limited. For this purpose, the chamber 70 incorporates liquid refrigerant coolant 82 which, when the vehicle is stationary, collects by gravity at the lowest point of the chamber 70. However, when the rotor begins to rotate, paddles 84 disposed periodically around the inside 83 of the sleeve 60 scoop the liquid coolant 82 and splash the coils 16 around the entire periphery of the stub axle 50. As the speed of rotation of the rotor 14 increases, centripetal acceleration may retain the fluid against the internal wall of the rotor 14. Accordingly, at the top of the stator 12, and potentially elsewhere around its periphery, are disposed scoops 86 that catch the liquid and splash it into contact with the coils 22.

The paddles 84 may be omitted, on the ground that, until speed builds up, cooling of the coils will not generally be necessary. Once speed has built up, however, centripetal acceleration and friction between the liquid and inner surface 83 of the sleeve will retain the liquid against the surface, so that it rotates also around the stub axle 50 with the rotor 14. In this event, the scoops 86 may be arranged closer to the surface 83 of the sleeve 60. Indeed, with reference to FIG. 3b, in the direction of rotation (eg normal forwards rotation for a vehicle in the direction of the Arrow C), the scoops 86a,b,c, may be progressively closer to the surface. Thus, if there are three of them as shown, at ninety degree locations, paddle 86a will scrape off a first depth of the rotating liquid 82 (shown collected at the bottom), scoop 86b a second depth, closer to the surface 83, and scoop 86c scraping off most of what remains.

Figure 4A:
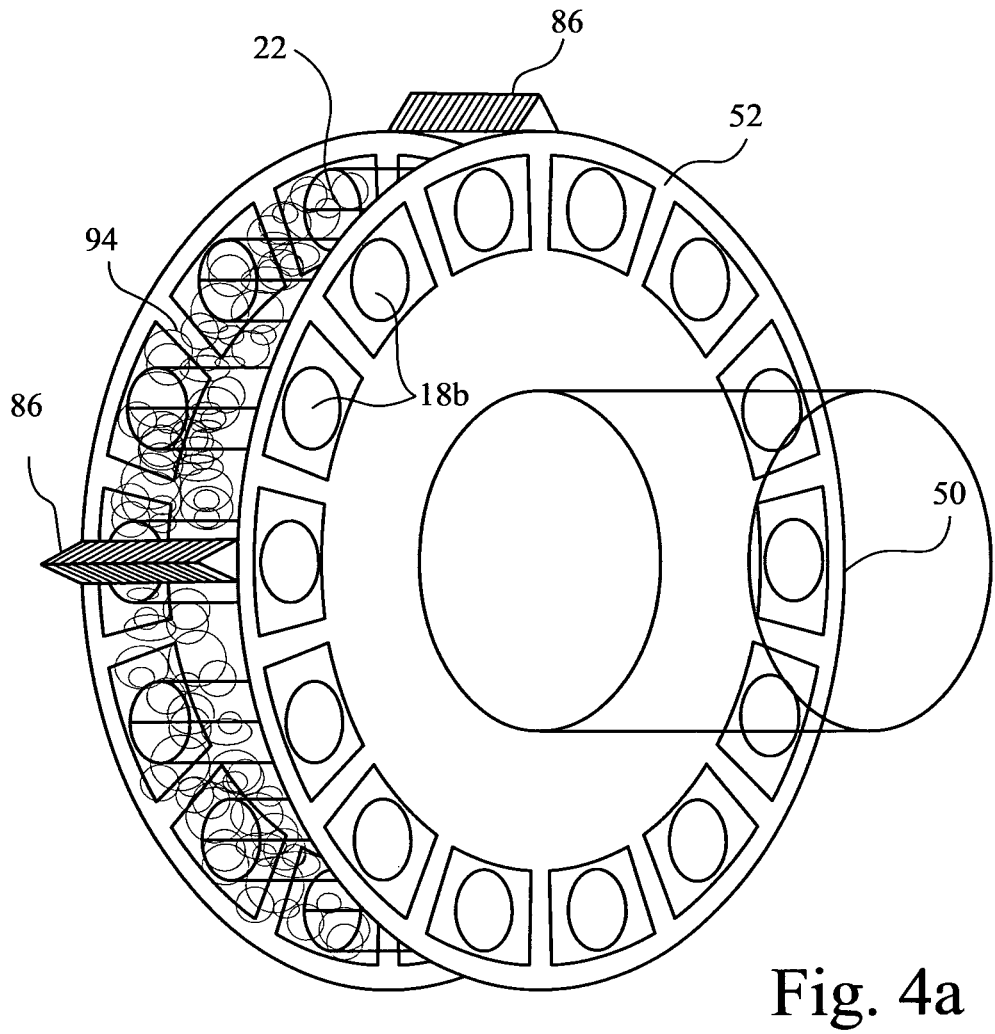
Figure 4B:
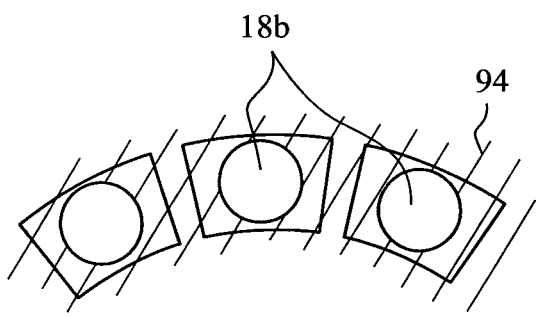

However, interspersed between and around the coils 22 is diffuse material 94 (see FIGS. 4a,b) that absorbs the liquid coolant and wets the coils 22. Indeed, the material may be a wicking material, akin to cotton wool, such as rock wool, for example. As heat begins to be generated by the coils 22, this is transferred to the liquid refrigerant. This is arranged to have a boiling point below the desired working temperature of the coils 22. Accordingly, when that temperature is reached, the liquid boils and evaporates so that it is driven away from the coils 22 taking heat with it, further liquid coolant being drawn in by the wicking material 94. The vapor then filling the chamber 70 contacts the surfaces of the housing 14 which, at least around its periphery, is provided with fins 96. At ambient temperature, the coolant is arranged to condense and give up its heat to the material of the rotor housing 14 and return to liquid form where the cycle can be repeated.

As the temperature of the motor builds, the vapour pressure in the chamber 70 builds up but it cannot escape if the seal provided by the lip seal 72 is gas tight. While it does not escape and pressure builds as more heat is generated by the coils 22, the boiling temperature of the liquid increases so that the temperature of the rotor housing also increases, shedding heat more quickly. Consequently, although the temperature of the coils also rises, the system is self regulating in shedding heat more quickly as it gets hotter. However, by virtue of the evaporative heat transfer, the temperature gradient between the coils 22 and housing 54 is much less while still transporting heat.

An advantage of the present invention is that the rotor 96, in rotating as it is driven, is exposed to a cooling airflow not only from its own progress, but also from the progress of the vehicle (when, as shown in FIG. 3a, the motor is mounted in a vehicle). In the case of a wheel motor as also shown in FIG. 3a, the wheels 90 may have apertures at 98 whereby airflow a can wash over the rotor housing 14 from outside the vehicle. Indeed, both the wheel 90 and the fins 96 may be arranged to scoop air and draw it over the housing 14. For example, the wheel 90 may be provided with scalloped apertures 98, so that air is directed towards the rotor housing 14. Alternatively, or in addition, the fins 96 may be arranged as a helix screw so that air is pumped, for example, in the direction of the arrow BB in FIG. 3a.

The bearings 62,68 are shown in contact with the chamber 70. If this is the case, it is important that the coolant 82 act as a lubricant for the bearings. Alternatively, it would be possible to isolate the bearings 68 from the chamber 70. For example, seal 72 could be inboard (with respect to the chamber 70, of the bearing 64. Another lip seal would be required for bearing 68 to isolate that from the chamber 70. It is also important that the coolant 82 not affect the electronics 92.

Figure 5:
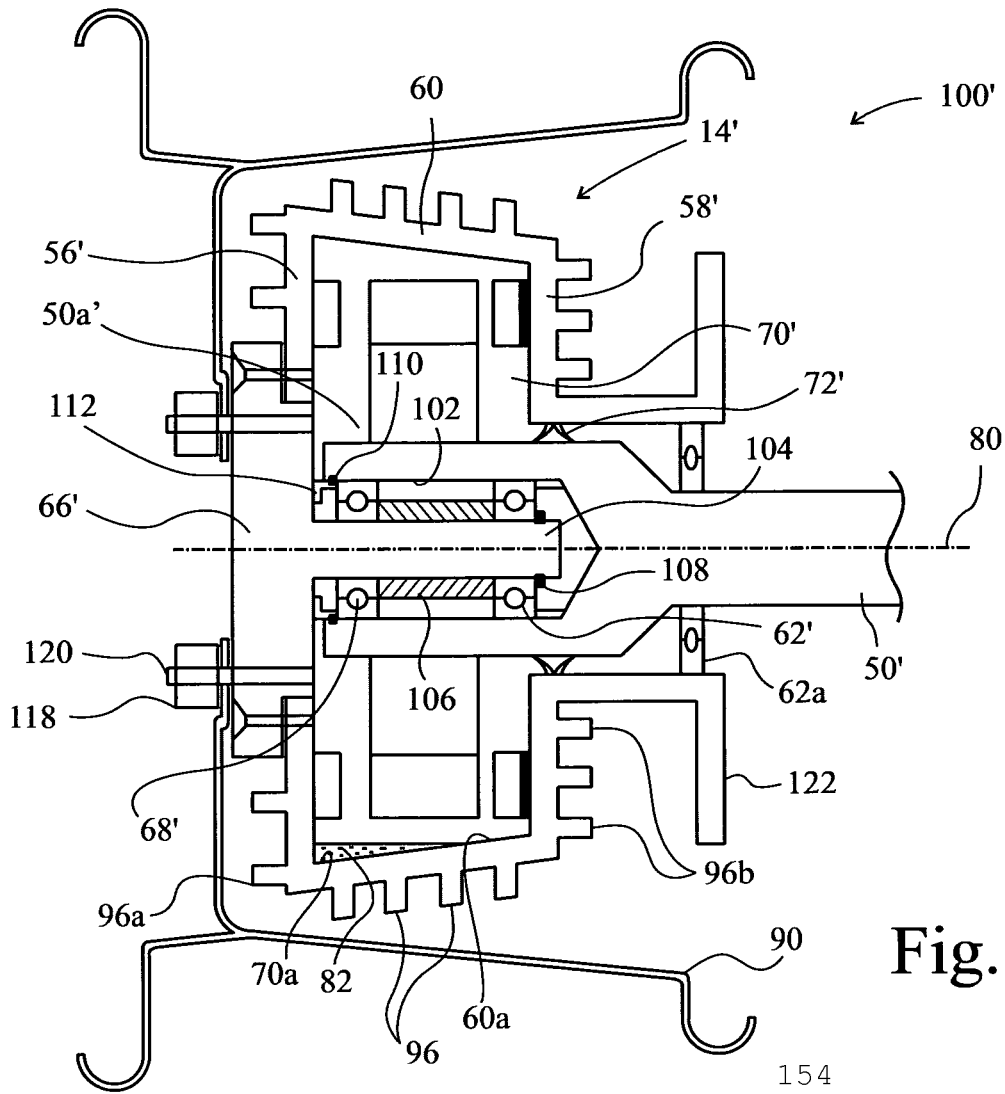
FIG. 5 is a similar view to FIG. 3a, but where the bearing arrangement is modified.

Turning to FIG. 5, an alternative embodiment of a motor 100' is illustrated. Here, a stub shaft 50' of a vehicle (not shown) has a hollow end 50a' in the bore 102 of which is received the shaft 104 of rotor plate 66'. The shaft 104 is supported on bearings 62',68' which are spaced apart by a spacer 106 and retained by circlips 108, 110. Circlip 110 may be replaced by a nut serving to preload the bearings 62',68'. A seal 112 isolates the bearings 62',68' from chamber 70' containing liquid refrigerant coolant 82.

The rotor 14' has a plate 66' that is connected to rotor housing plate 56,' which is itself connected to corresponding rotor housing plate 58' via a coned sleeve element 60. The taper of the sleeve 60 ensures that the liquid coolant 82 collects in a most radially distant (from the rotation axis 80) corner 70a of the chamber so that more of the internal surface 60a of the sleeve 60 is exposed to direct contact by vapour in the chamber 70, rather than being insulated therefrom by liquid coolant 82.

Fins 96 are disposed, as in the embodiment described above, on the sleeve 60. In addition, however, fins 96a,b (being axially directed and circumferentially disposed) are provided on the annular plates 56',58'. Otherwise, the arrangement is much as described above, with the wheel 90 being bolted by nuts 118 on studs 120 received in the plate 66'. A brake disc 122 is mounted on the inside annular plate 58' and a seal 72' isolates the chamber 70' from the external environment. A further bearing 62a may support the brake disc 122.

Figure 6:
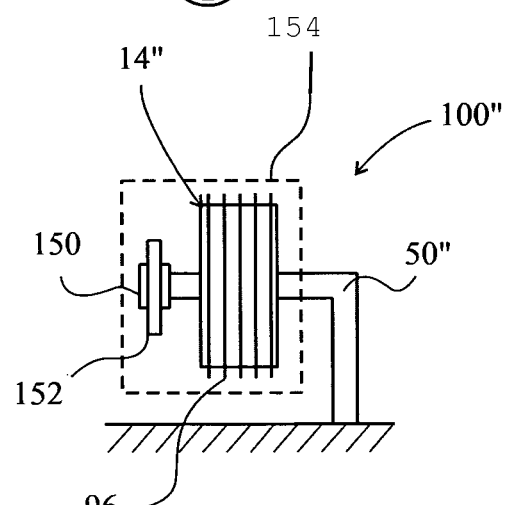
FIG. 6 is a schematic diagram of a generator arrangement in accordance with the invention.

In FIG. 6, a generator 100" has essentially the internal structure of the motor illustrated in FIG. 5 or 6. Here a stub axle 50" is mounted on the ground and the rotor housing 14" is driven by a pulley 150 and belt 152. The rotor has fins 96 and the entire rotating assembly is protected by an apertured guard 154.

Figure 7:
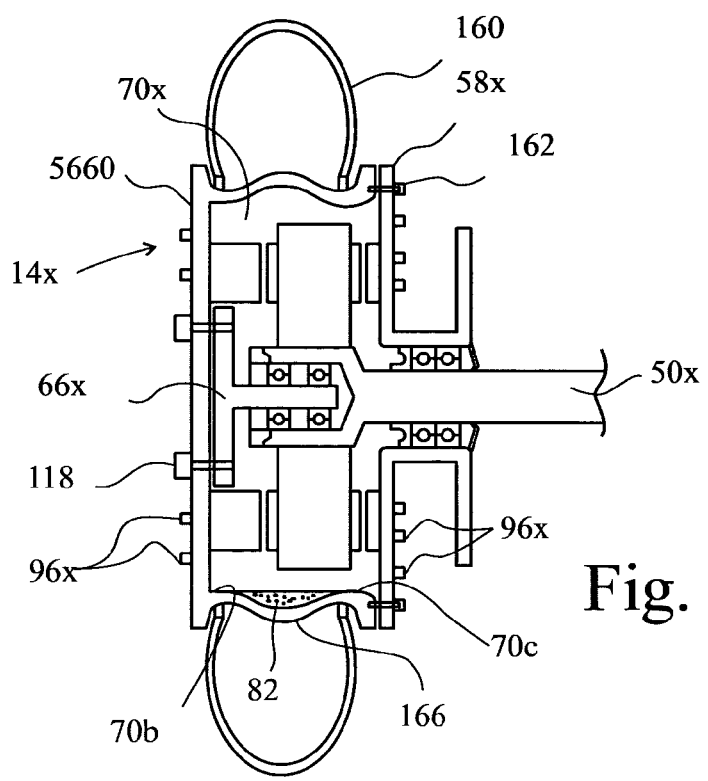
FIG. 7 is another schematic variation of the arrangements of FIGS. 4 and 5.

In FIG. 7, rotor housing 14x has a vehicle tyre 160 mounted directly on flanges 162 of the housing. In this case, the rotor may be in two parts, a first hub part 5660, bolted onto the vehicle hub 66x by bolts 118, and a second flange part 58x, secured by bolts 162 to the hub part 5660, and sealed thereto by means not shown. As in the arrangement of FIG. 5, the hub 66x is journalled for rotation in the stub axle 50x, suspended from the vehicle (not shown). Fins 96x are on the sides of the rotor 14x. The rotor 14x may be recessed at 166 between tyre beads 168 to pool liquid coolant 82 and permit the edges/corners 70b,c of the chamber 70x to be free of liquid giving direct access of vapour to the cooler surfaces of the rotor 14x.

Figure 8:
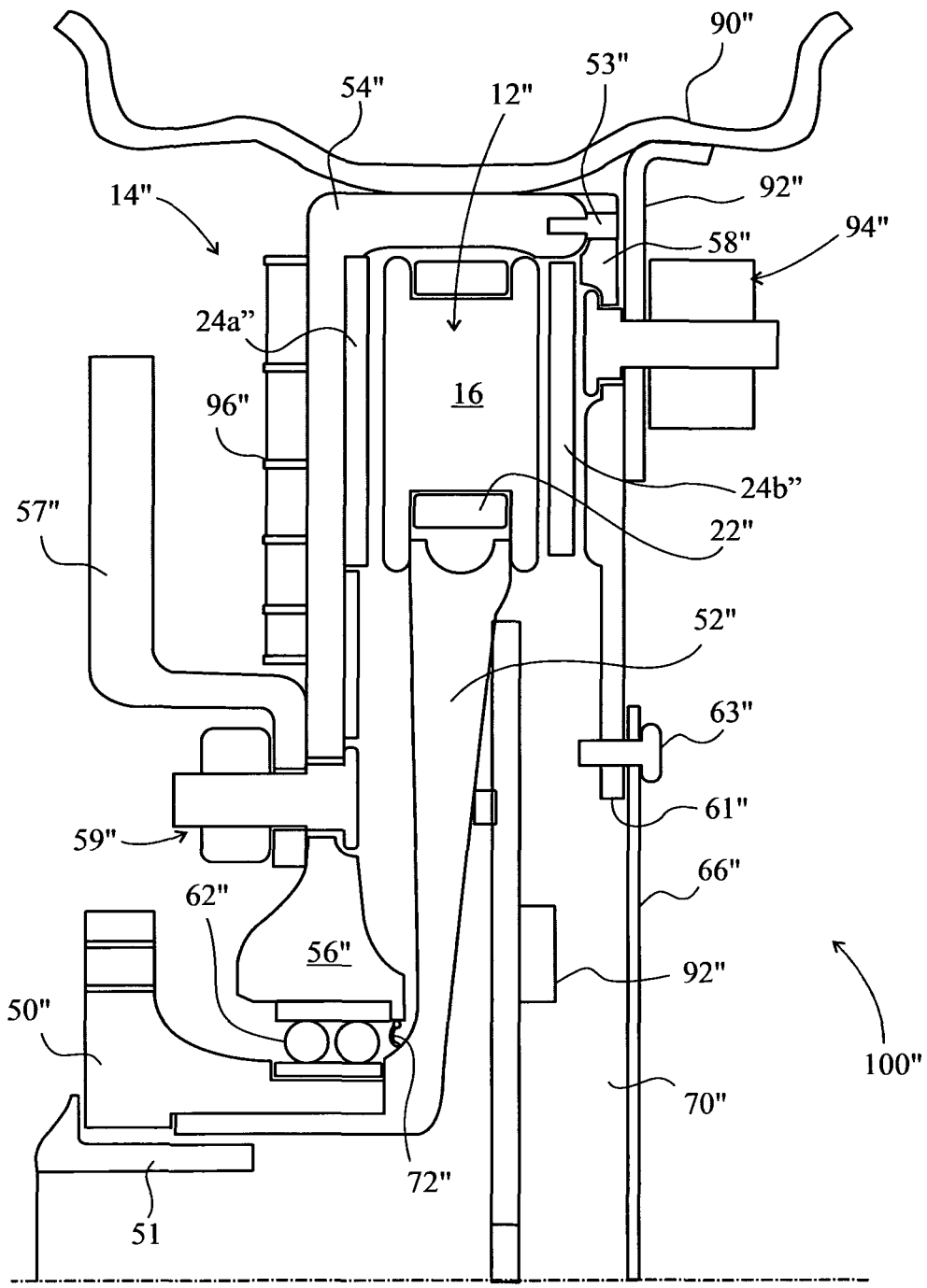

In FIG. 8, a motor 100 comprises a hub 50" for fixing to vehicle suspension (not shown). The hub carries a bearing 62" that rotatably mounts a rotor flange 56". The flange 56" mounts both a rotor housing member 54" and a brake disc 57", by means of studs and nuts 59". The rotor housing member 54" is finned at 96" to shed heat, as described above with reference to FIG. 3a.

The hub 50" also mounts a stator disc 52" on which a number of stator bars 16 are fixed, around which are wound coils 22". The disc 52" mounts power electronics circuit board 92". To a face edge of cupped rotor housing member 54" is secured by fasteners 53" apertured rotor plate 58". Its aperture 61" is closed and sealed by a cover plate 66", although access can be gained to the electronics board 92" by removing fasteners 63". The rotor components 54",58" mount permanent magnets 24"a,b, disposed adjacent the stator coils 22.

A seal 72" closes the chamber 70" defined between rotor 14" and hub 50" and surrounding the stator 12". Hub 50" has a central bore 51" that is open, but it is plugged (by a plug not shown) to complete the seal and close chamber 70", although cabling (not shown) from the vehicle for powering and controlling motor 100" will pass through the plug to connect with electronics board 92".

Rotor plate 58" mounts a wheel 90" that has an internal flange 92" for this purpose, through studs and nuts 94". Otherwise, the arrangement is as described above and refrigerant in the chamber 70" cools both the coils 22" and the electronics board 92". The fins 96" may be spirally arranged on the face of the rotor housing member 54" to promote circulation as the rotor rotates about the hub 50".

Suitable coolants are known to those skilled in the art (such as water, methyl acetate, flouro benzene, 2-heptene) and may be arranged so that the coils have a working temperature in the range ambient −150° C., with a coolant boiling point in the range 50-80° C. between 0.1 bar and 5 bar of pressure, depending on the application. In this scenario, the temperature of the housing 54 will be in the range ambient −80° C.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

[1] T J Woolmer and M D McCulloch "Analysis of the Yokeless and Segmented Armature Machine", International Electric Machines and Drives Conference (IEMDC), 3-5 May 2007

The invention claimed is:
1. An electric machine comprising a rotor having a rotor field and a stator having coils for magnetic interaction with the rotor field across an air gap defined between the rotor and stator, wherein:
   the stator is a fixed component with respect to a mounting for the machine and the rotor rotates around the stator externally thereof forming a rotating rotor housing defining a sealed chamber between the rotor and stator incorporating a fluid cooling medium to cool the coils and to transfer heat removed from the coils to the rotating rotor housing,
   the cooling medium has a boiling point less than a design temperature of operation of the stator and more than a design temperature of operation of the rotating rotor housing,
   the rotating rotor housing has a heat dissipating external surface accessible by a coolant,
   the stator is mounted on a stub axle of said mounting and on which stub axle said rotor is rotationally journalled,
   the electric machine is an axial flux machine, the coils being wound on bars that are disposed circumferentially spaced around a fixed axle of the machine forming a rotational axis of the rotor, the bars are parallel to the rotational axis, the rotor comprising two stages each having permanent magnets interacting with each end of the bars, and the rotor stages each comprise an annular dish, whose outer rims are connected together by a sleeve and which mount said permanent magnets, an inner rim of one stage being journalled on said stub axle, and the other stage being closed by a plate.

2. The electric machine as claimed in claim 1, wherein said coolant is air of the open environment, whereby air movement relative to the housing caused at least by said rotation absorbs heat from said external surface.

3. The electric machine as claimed in claim 1, wherein the electric machine is a permanent magnet machine, wherein said rotor field is developed by permanent magnets disposed on the rotor.

4. The electric machine as claimed in claim 1, wherein the electric machine is an axial flux machine, the coils being wound on bars that are disposed circumferentially spaced around a fixed axle of the machine forming a rotational axis of the rotor.

5. The electric machine as claimed in claim 4, wherein the bars are parallel to the rotational axis, the rotor comprising two stages each having permanent magnets interacting with each end of the bars.

6. The electric machine as claimed in claim 1, wherein said plate is also journalled on an end of said stub axle extending through said stator.

7. The electric machine as claimed in claim 1, wherein said plate and said other stage are a unitary component.

8. The electric machine as claimed in claim 1, wherein said rotor housing has fins forming heat dissipating external surface to shed heat externally.

9. The electric machine as claimed in claim 1, wherein said chamber is sealed on said stub axle by a lip seal.

10. The electric machine as claimed in claim 1, wherein diffusive material is disposed around and between said coils whereby liquid cooling medium is captured and transported to the coils and vapour from the liquid evaporating from the coils escapes.

11. The electric machine as claimed in claim 1, wherein paddles are disposed internally of the rotor housing to wash liquid cooling medium around the stator.

12. The electric machine as claimed in claim 1, wherein scrapers are disposed on the stator to scoop onto the stator liquid cooling medium held against the inside of the rotor housing by centripetal acceleration.

13. The electric machine as claimed in claim 1, wherein said machine is a motor.

14. The electric machine as claimed in claim 13, wherein the machine is a wheel motor of a vehicle.

15. The electric machine as claimed in claim 14, wherein a vehicle wheel is mountable on said rotor housing with a brake disc being mountable on said rotor housing.

16. A vehicle having a stub axle suspended from the vehicle and on which stub axle a motor being an electric machine as claimed in claim 14 is mounted.

17. The vehicle as claimed in claim 16, wherein a wheel of the vehicle is mounted on said rotor housing.

18. The vehicle as claimed in claim 17, wherein the wheel has apertures to allow access to air passing the vehicle to flow through the wheel and cool the rotor housing.

19. The vehicle as claimed in claim 18, wherein the electric machine is an axial flux machine, the coils being wound on bars that are disposed circumferentially spaced around a fixed axle of the machine forming a rotational axis of the rotor; and wherein the bars are parallel to the rotational axis, the rotor comprising two stages each having permanent magnets interacting with each end of the bars and wherein said fins have a helical form on said housing so as to draw air through said apertures.

20. The vehicle as claimed in claim 16, wherein regenerative braking is employed to retard the vehicle, in which event the motor also acts as a generator.

21. The vehicle as claimed in claim 16, wherein a brake disc is mounted on said rotor housing.

22. The vehicle as claimed in claim 21, wherein the electric machine is an axial flux machine, the coils being wound on bars that are disposed circumferentially spaced around a fixed axle of the machine forming a rotational axis of the rotor; and wherein the bars are parallel to the rotational axis, the rotor comprising two stages each having permanent magnets interacting with each end of the bars and wherein said disc is mounted on one stage of the rotor.

23. The vehicle as claimed in claim 16, wherein a tyre is mounted directly on said rotor housing.

24. The electric machine as claimed in claim 1, wherein said machine is a generator, means being provided to rotate the rotor about said stator.

25. The electric machine as claimed in claim 24, wherein said means comprises a belt and pulley.

26. The electric machine as claimed in claim 24, further comprising a housing having access to a cooling airflow in order to enable the rotor to shed heat.

27. An electric machine as claimed in claim 1, wherein the chamber in use in ambient conditions comprises a volume that is filled to less than about 25% capacity with liquid cooling medium.

28. The electric machine as claimed in claim 27, wherein the volume not filled with liquid cooling medium is filled only with vapour cooling medium.

29. The electric machine as claimed in claim 1, wherein electronic components controlling operation of the machine are mounted in said chamber on the stator and are cooled by said cooling medium.

30. The electric machine as claimed in claim 29, wherein bars are parallel to the rotational axis, the rotor comprising two stages each having permanent magnets interacting with each end of the bars and wherein said electronic components are mounted on said stub axle.

* * * * *